United States Patent [19]
Fishman

[11] Patent Number: 6,111,679
[45] Date of Patent: Aug. 29, 2000

[54] METHOD AND SYSTEM FOR OPTICAL MULTICHANNEL TRANSMISSION USING COHERENCE DIVISION MULTIPLEXING WITH OPTICAL FILTERING

[75] Inventor: Ilya M. Fishman, Palo Alto, Calif.

[73] Assignee: Optimight Communications, Inc., Calif.

[21] Appl. No.: 09/063,758

[22] Filed: Apr. 21, 1998

[51] Int. Cl.[7] .................................................. H04B 10/12
[52] U.S. Cl. .......................... 359/173; 359/115; 356/345
[58] Field of Search ..................................... 359/173, 115; 356/345

[56] References Cited

U.S. PATENT DOCUMENTS

| | | | |
|---|---|---|---|
| 4,860,279 | 8/1989 | Falk et al. ............................. | 370/1 |
| 4,956,834 | 9/1990 | Coleman ................................ | 370/1 |
| 5,459,600 | 10/1995 | Davis et al. ........................... | 359/173 |
| 5,473,459 | 12/1995 | Davis ................................... | 359/183 |
| 5,606,446 | 2/1997 | Davis et al. ........................... | 359/173 |
| 5,691,832 | 11/1997 | Liedenbaum et al. .................. | 359/115 |
| 5,946,429 | 8/1999 | Huang et al. .......................... | 385/12 |
| 5,991,026 | 11/1999 | Kluth et al. ........................... | 356/345 |

FOREIGN PATENT DOCUMENTS 0 639 011 A1  2/1995  European Pat. Off. ......... H04J 14/08

OTHER PUBLICATIONS

"Coherence Multiplexing of Fiber–Optic Interferometric Sensors", published in *Journal of Lightwave Technology* in Oct. 1985, vol. LT–3, No. p. 1062–1072.

"Selective Interferometric sensing by the Use of Coherence Synthesis", published in *Optics Letters* in Nov., 1987, vol. 12, No. pp. 944–946.

"Theoretical Noise Performance of Coherence–Multiplexed Interferometric Sensors", published in *Journal of Lightwave Technology* in Jun. 1989, vol. 7, No. 6, pp. 941–956.

Rogers, et al entitled "Low Coherence Interferometric Fiber Multiplexed Sensor Systems Using an Integrated–Optical Configuration", published in Proceedings of the SPIE, on Jun. 1995, vol. 2510, pages 100–109.

*Primary Examiner*—Lesile Pascal
*Assistant Examiner*—Hanh Phan
*Attorney, Agent, or Firm*—Bella Fishman

[57] ABSTRACT

A method and system of Coherence Division Multiplexing (CDM) for transmitting of a plurality of optical signals over the same optical fiber utilizing path-matched interferometry and phase modulation of partially coherent light, based on optical selecting and filtering of each CDM optical signal and reducing noise affiliated with other non-selected CDM optical signals.

33 Claims, 7 Drawing Sheets

METHOD AND SYSTEM FOR OPTICAL MULTICHANNEL TRANSMISSION USING COHERENCE DIVISION MULTIPLEXING WITH OPTICAL FILTERING

BACKGROUND OF THE INVENTION

The present invention relates to the optical fiber telecommunication networks, and more particularly, to the methods and systems for multichannel optical fiber communication.

Conventional methods for multiplexing several communication channels over the same fiber are Time Division Multiplexing (TDM) and Wavelength Division Multiplexing (WDM). In the TDM method, the number of communication channels is determined by a transmission bit rate. Bit rates of 622 Mbit/sec, 2.5 Gbit/sec and, lately, 10 Gbit/sec are conventional for modern long distance telecommunication networks.

In the WDM method, a separate transmission wavelength is assigned to each communication channel within the transparency band of the optical fiber (1500 nm or 1310 nm). All WDM channels are transmitted over the same fiber. For example, the number of WDM channels in the existing networks may exceed 40 in the optical band of 1530–1560 nm of Er-doped fiber optical amplifier, with spectral distance between the channels 0.8 nm or less.

Both TDM and WDM methods have a theoretical capacity limit related to the optical transparency band width divided by bandwidth required for each individual channel. Optical fiber has an active transparency band of $5 \cdot 10^{13}$ sec$^{-1}$ in the proximity of 1550 nm. In this transparency band, over 1000 channels having 2.5 Gbit/sec rate may be transmitted.

However, practically available TDM and WDM systems have capacities substantially below the theoretical limit. The maximum TDM bit rate is limited by maximum operational frequency of modern semiconductor devices. Potential resources of these devices will be exhausted above 40 Gbit/sec which is almost three orders of magnitude less than the frequency required to fully explore the fiber transmission capacity.

WDM method allows, in principle, to utilize the fiber transmission capacity in full. However, to separate adjacent WDM channels, the transmitters and receivers with very stable central frequencies and narrow passbands have to be fabricated. Contemporary active transmitters such as DBR and DFB lasers, and receivers such as fiber gratings, are sophisticated devices vulnerable to environmental fluctuations. Deployment of these devices and feedback circuits required for their stabilization increases complexity and reduces reliability of the existing networks. The projected cost associated with the new generation of WDM equipment having required spectral resolution may be higher than placing additional fiber in the ground.

In a recent attempt to improve the multichannel communications efficiency by better bandwidth utilization a method of Coherence Division Multiplexing (CDM) was suggested based on using phase modulation of partially coherent light. The CDM method employs path-matched white light interferometry which is well known in physics of light sources with a broad optical spectrum. Light Emitting Diodes (LED) and Erbium Doped Fiber Amplifiers (EDFA) are sources having a short coherence length $L_C \sim 20-30$ $\mu$k. [see, for example, H. Lefèvre, The Fiber-optic Gyroscope, Artech House, Boston, 1993, and references therein]. Two light beams originated from the same LED or EDFA may interfere if the optical paths of these beams differ by less than several coherence lengths. In path-matched interferometry, the path difference $L \gg L_C$ between two beams created by a first interferometer is compensated by a second interferometer. Two matched interferometers connected by an optical fiber may be used for signal transmission.

CDM method of multichannel transmission using path-matched interferometry was a subject of a detailed theoretical and experimental analysis. Results of this analysis were described in a number of publications [Wentworth, R. H. et al. "Theoretical noise performance of coherence-multiplexed interferometric sensors", J. of Lightwave Technology 1989, 7, p. 941; Youngquist, R. C. et al. "Selective interferometric sensing by the use of coherence synthesis", Optics Letters, 1987, 12, p. 944; Brooks, J. L. et al. "Coherence multiplexing of fiber-optic interferometric sensors" J. of Lightwave Technology, 1985, LT-3, p. 1062]. Proposals to use CDM for telecommunication were disclosed in U.S. Pat. Nos. 5,549,600, 5,473,459 and 5,606,446.

According to one of the approaches described in the cited articles and patents, the beam of light originated from a short coherence length source 1 is separated into N individual primary channel beams 2 as shown in FIG. 1. On transmitting end 3, transmitting Mach-Zhender interferometers 4 introduce in each of these N primary channel beams 2 a corresponding optical delay $L_1, L_2, L_3, \ldots L_N$ wherein each optical delay exceeds several coherence lengths $L_C$. Each channel beam is phase modulated, and all N beams are combined and transmitted over optical fiber 5. On receiving end 6, the transmitted light is split into N secondary beams, the optical delay is compensated by receiving interferometers 7, and the phase modulation is detected by detectors 8 connected to the output of interferometers 7.

The CDM communication system of FIG. 1 has a serious drawback precluding it from practical implementation. This drawback relates to a low fringe visibility inherent to partially coherent light interferometry. Two interference patterns for partially coherent light for a light source with a uniform spectrum in a spectral range $\Delta\omega$ are shown in FIG. 2. Interference pattern 1 is a reference pattern showing intensity as a function of phase $\phi$ for two interfering beams originated from the same light source, and interference pattern 2 is a channel interference pattern for a CDM system with 5 channels. Each interference pattern has its carrier or central phase equal 0 and −50 rad for interference patterns 1 and 2, respectively), and phase range where fringe visibility is measurable. This phase range corresponds to a difference in optical paths of several coherence lengths, and is approximately 30 rad for the interference patterns 1 and 2 of FIG. 2. Even for the simplest case of two interfering beams, the fringe visibility $\gamma$ is less than 100%, $\gamma=$ $$\gamma = \frac{I_{max} - I_{min}}{I_{max} + I_{min}},$$

where $I_{max}$ is intensity measured at $\phi=0$, and $I^{min}$ is intensity measured at $\phi = \pm\pi$. For a 5-channel system, when the source output is split into five equal portions before modulation (see FIG. 1), the fringe visibility is less than 40%, as illustrated by interference pattern 2 which is the pattern of one of the working CDM channels. The carrier phase of the this channel is $\phi_1 \sim 50$ rad, or approxiamately 8 central wavelengths. Interference patterns for other channels, not shown in FIG. 2, will have larger phase shifts (for example, 100 rad, 150 rad etc.) and similar fringe visibility. For each of five channels, only 20% of the full light intensity may be used for signal transmission. Maximum signal may be detected when the interference pattern is shifted by $\pi$. The signal detected in each channel of a N-channel system (N is a number of channels), does not exceed $2/N^2$ fraction of full light intensity.

The signal to noise ratio in CDM systems was thoroughly studied by Prof. H. J. Shaw and his group at Stanford University, Stanford, Calif. The results of these studies were published in a Ph.D. Thesis [R. H. Wentworth, Optical Noise in Interferometric Systems Containing Strongly Unbalanced Paths, Stanford University, 1988] and references cited above. It was shown that the CDM system of FIG. 1 has poorer signal to noise ratio than TDM or WDM system of equal capacity, and hence have no potential advantages compared to TDM or WDM systems.

In each of N channels, the incoherent component, or the fraction $(N-1)/N^2$ of the full intensity, does not carry signal but fluctuates in time and produces noise. Hence, in a detecting system shown in FIG. 1, a signal to noise ratio of detectors 8 is proportional to $1/N$. For large N, this ratio is significantly worse than $1/\sqrt{N}$ normally expected from TDM or WDM systems.

In each receiving channel of the prior art system of FIG. 1, the detected signal is related only to one channel, but the detected noise is related to all other transmission channels. Such detection makes the CDM system impractical for multichannel transmission. The prior art CDM systems are not compatible with the existing single channel transmission equipment which require. the fringe visibility close to 100% and quantum limited signal to noise ratio, and thus have no practical value for multichannel telecommunication.

SUMMARY OF THE INVENTION

It is therefore an object of the present invention to overcome the drawbacks of the prior art and provide a method and system compatible with the existing single channel transmission equipment for application in multichannel telecommunication networks.

A Coherence Division Multiplexing System of the present invention comprises a light source having a spectral range comparable to a transparency band of an optical fiber through which the optical signals are transmitted; a transmitting system for producing a plurality of coherence divided multiplexed (CDM) optical signals and propagating them through the optical fiber; a receiving and filtering system for selecting each CDM optical signal and optical filtering of noise caused by all other non-selected CDM optical signals; and a detecting system which converts each selected CDM optical signal into an electrical signal.

For each CDM optical signal, its interference pattern is acquired, the parameters of each interference pattern for each CDM optical signal are measured, and noise caused by all other non-selected CDM signals is reduced by optical filtering. According to the Coherence Division Multiplexing method of the present invention, an optical filtration of a plurality of CDM optical signals characterized by respective plurality of interference patterns is provided by utilizing differential interferometry technique. To provide adequate fringe visibility, the adjacent differential interferometers are provided with an adequate phase shift. Differential interferometers may be implemented as a plurality of planar waveguides made of glass on Si wafers or as a pair of spaced apart diffraction transmission or reflection gratings. With the optical filtering of the present invention, almost 100% fringe visibility may be achieved in CDM method and system, and CDM signal to noise ratio becomes close to the optimally designed WDM and TDM systems.

The CDM method and system of the present invention provide transmission of a number of channels limited only by the spectral range of light sources and stability of phase delay components.

The foregoing and other objects, features and advantages of the present invention will become apparent from the following detailed description of the preferred embodiment taken together with the accompanying drawings.

DESCRIPTION OF THE PREFERRED EMBODIMENT

CDM transmission of the prior art methods and systems, as shown above, is inefficient in comparison with TDM and WDM because of excessive noise. However, this is not a principal limitation but rather a result of previously employed detection method and system.

If a light source of power $P_0$, central wavelength $\lambda$ and bandwidth $\Delta\omega=2\pi c_0$ $$\Delta\omega = 2\pi c_0 \frac{\Delta\lambda}{\lambda^2},$$

where $c_0$ is velocity of light, is designated for TDM transmission with maximum capacity, Fourier-limited pulses of duration $\tau_{min}=1/\Delta\omega$ must be used. No additional optical filtering is required, and the electronic filter should have a cut-off frequency $\Delta\omega$.

If the same bandwidth is used for transmission of an equal number of WDM channels, the frequency range $\Delta\omega$ is divided into thin slices, and each channel is transmitted in its own frequency slice. To provide maximum capacity and maximum signal to noise ratio, both optical and electronic filters should have bandwidth of $\Delta\omega/N$.

Figure 1:
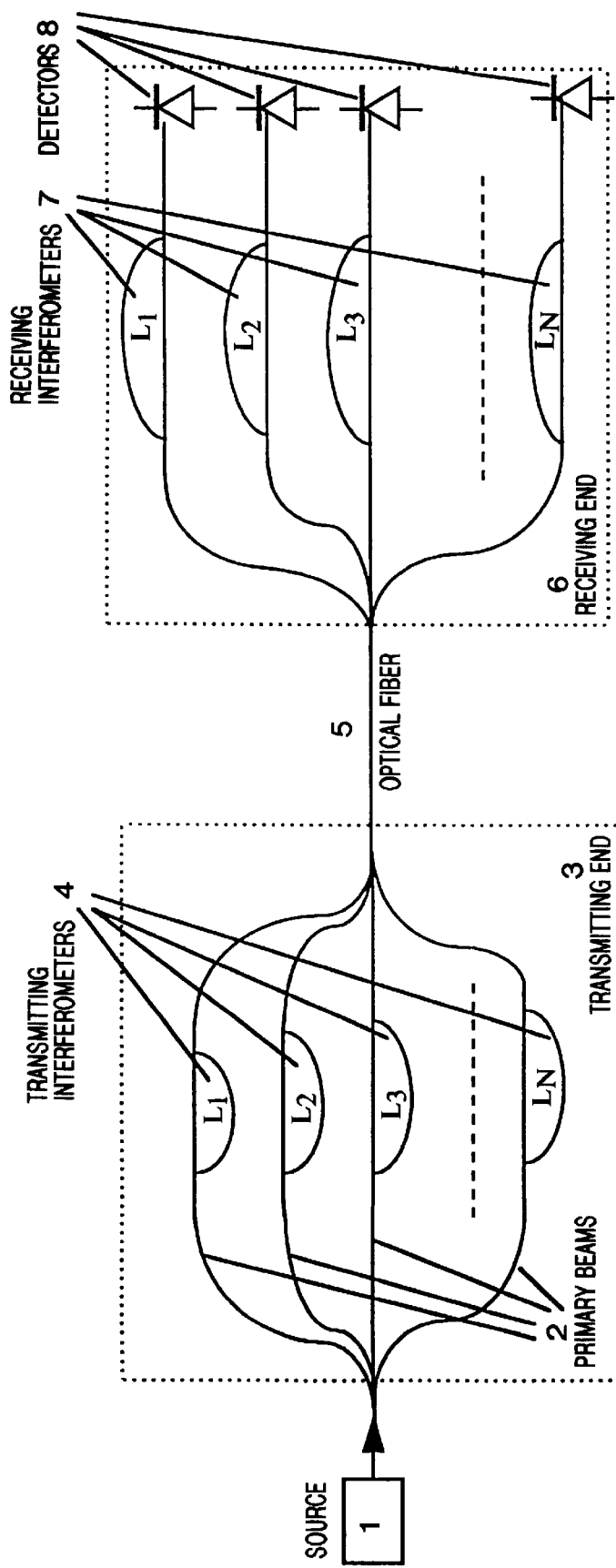
FIG. 1 shows a schematic diagram of a prior art CDM system.

In a CDM method, the transmission parameters are intermediate between TDM and WDM: for each transmission channel, the full optical bandwidth $\Delta\omega$ is used, but the bit rate in each channel is $\Delta\omega/N$. In the prior art CDM system of FIG. 1, each detector is exposed to an optical signal from one channel and noise from all transmission channels. To improve signal to noise ratio an optical filtering method and system has to be introduced to retain the signal value, cut the noise bandwidth and reduce detector exposure to the incoherent component from the light source.

According to the Coherence Division Multiplexing method of the present invention, a differential output optical field is measured in several points of a channel interference pattern separated by a certain phase difference, instead of a signal measurement at one specific phase ($\phi_1$ for channel pattern 2), corresponding to exact compensation of optical paths for this channel. The measurements of phase values may be conducted in the points of an interference pattern separated by $2\pi$ and shown by vertical arrows in FIG. 2.

Figure 2:
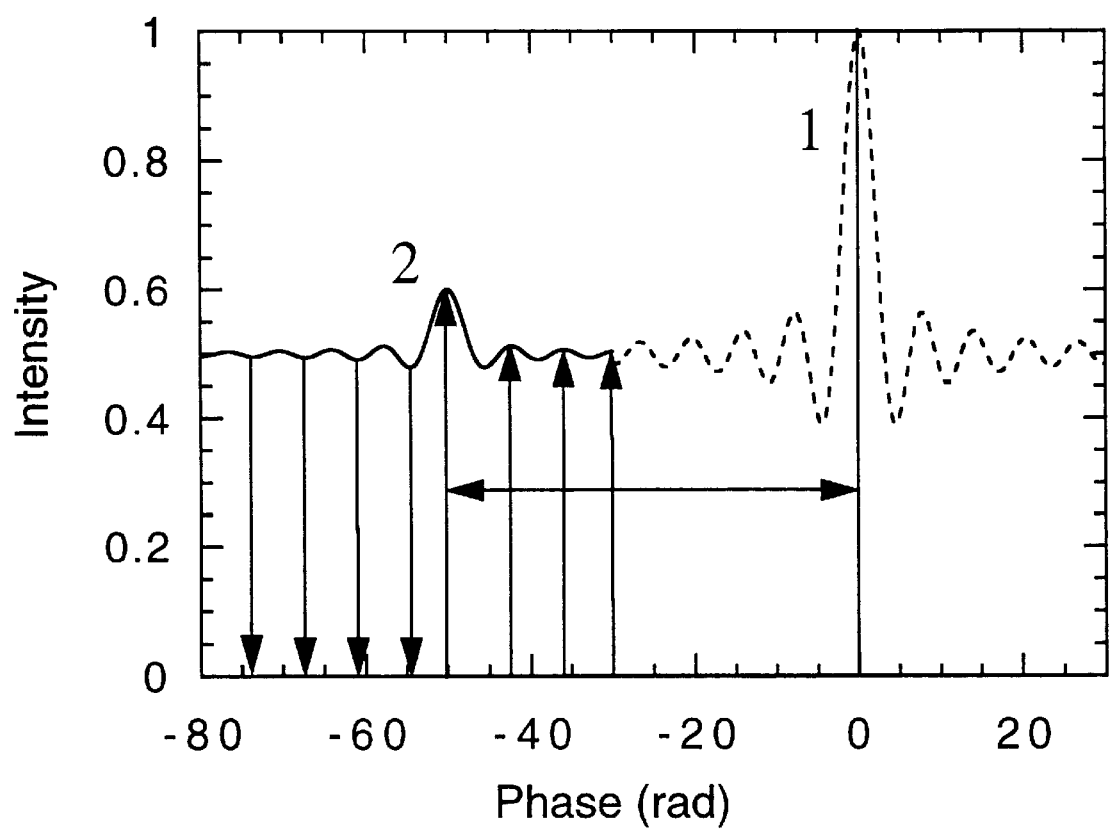
FIG. 2 shows interference patterns of partially coherent light.
Figure 3:
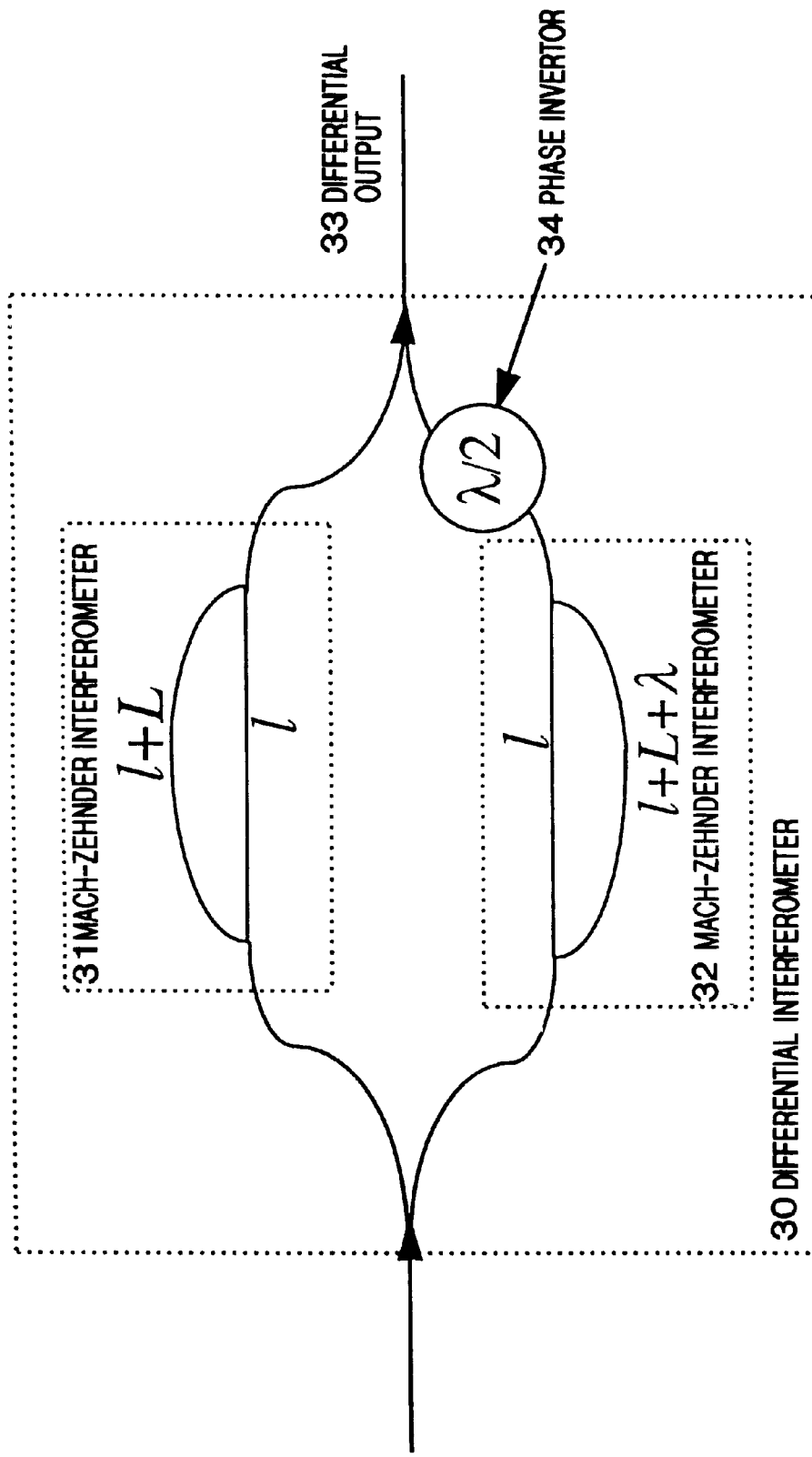
FIG. 3 is a schematic diagram of a differential interferometer of the present invention.
Figure 4:
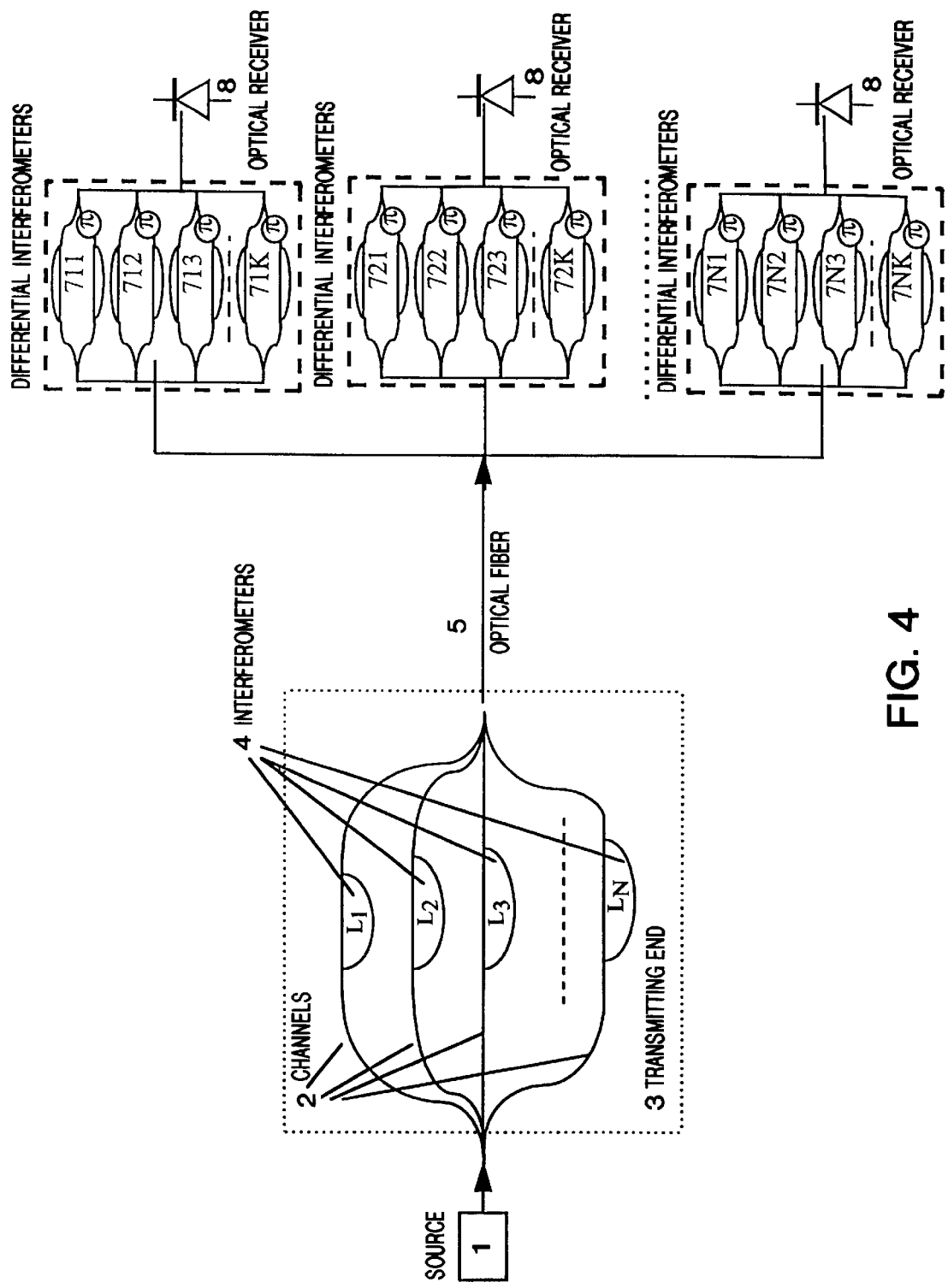
FIG. 4 is a schematic diagram of a CDM transmission system of the present invention.

Possible implementations of the optical filtering system are shown in FIGS. 3 and 4. To measure the differential optical field for two adjacent points of a channel pattern, differential interferometer 30 shown in FIG. 3 is used. Differential interferometer 30 comprises two Mach-Zehnder interferometers 31 and 32. Interferometer 31 comprises two arms with lengths l and l+L; interferometer 32 comprises two arms with lengths l and l+L+λ. At differential output 33, the outputs of interferometers 31 and 32 are subtracted using phase invertor 34 providing additional phase delay π for interferometer 32. In the presence of a signal, the output of differential interferometer 30 equals the difference between two adjacent maximums of the channel interference pattern 2 of FIG. 2. In the absence of a signal, the average output of differential interferometer 30 is zero. This embodiment allows to eliminate a DC offset caused by non-selected optical signals. However, there is still a random field (noise) which remains intact on the output of differential interferometer 30. To reduce the noise, several differential interferometers separated by an appropriate phase delay (for example, 4π) may be used in the range of L+$L_C$.

A principal diagram of a CDM system of the present invention with a new optical filtering system is shown in FIG. 4. A beam of light emitted by source 1 having wide optical spectrum is split into N channels 2, the optical path difference $L_1$, $L_2$, ... $L_N$ is introduced in channels 1, 2, ... N, respectively, e.g. coherence division is established, and each phase is modulated by interferometers 4. Coherence divided beams are then multiplexed in fiber 5 and transmitted to the receiving and filtering system, 25 where 711, 712, 713 ... 71K, 721, 722, 723 ... 72K, 71K, 72K, ... 7NK are differential interferometers connected in parallel to each other and measuring differential field in the channel interference patterns, K being a number of differential interferometers per each channel, and the optical signals are detected by optical receivers 8.

To retain mutual coherence between differential interferometers, the maximum difference in their optical paths should not exceed the coherence length $L_C$. Thus, the total number of differential interferometers K in the filtering system is approximately $2L_C/\lambda$. The output electric field of the filtering system of FIG. 4 is:

$$E_{det}=[E(\phi)-E(\phi+2\pi)]+[E(\phi+4\pi)-E(\phi+6\pi)] \quad (1)$$

where $E_{det}$ is electric field at the detector, and the square brackets frame the differential contributions from the first, second, etc. periods of the interference pattern.

For each channel, all differential interferometers with phases less than the carrier phase contribute to the measured signal with the same sign. FIG. 2 shows that for $|\phi|-|\phi_1|$, when the signal is present, all differential contributions are negative, and the measured field is $$E_{det} = \Delta E(\varphi) + \Delta E(\varphi + 2\pi) + \\ \ldots - [\Delta E(\varphi + \pi) + \Delta E(\varphi + 3\pi) + \ldots] \\ \approx \frac{E_s}{2} \quad (2)$$

where $E_S$ is electric field amplitude of the signal. For $|\phi|>|\phi_1|$, these contributions are positive and provide another $E_S/2$. For $|\phi|>|\phi_1|$, the field should be measured in minimums of the interference pattern shown in FIG. 2, and the result added to (2), thus providing the output of the optical filtering system of FIG. 4 practically equal to the signal amplitude $E_S$.

Figure 5:
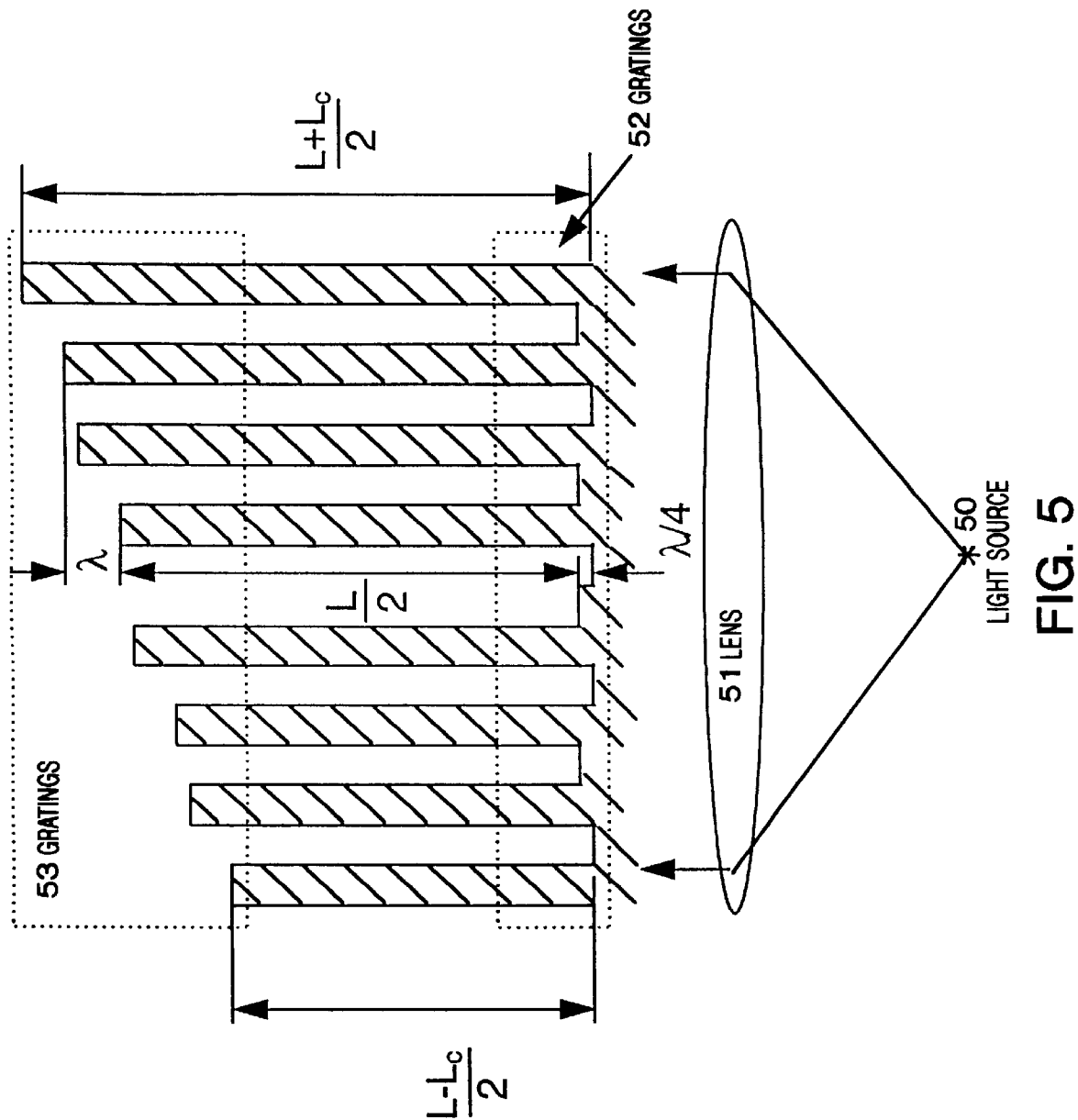
FIG. 5 shows a principle of a Multi-π Grating.

As shown in FIG. 5 where radiation from light source 50 is transformed into a parallel beam by lens 51 and diffracted by a system of waveguides, the architecture of the optical filtering system of FIG. 4 is equivalent to a system of two reflection diffraction gratings. The top and bottom of each waveguide is an interferometer performing the same function as interferometers 31 and 32 of FIG. 3. The bottoms and tops of each waveguide in FIG. 5 are shifted relative to the adjacent waveguides by λ/4 which provides phase shift of π in reflection geometry. Length λ/2 is added to each consecutive waveguide to provide phase shift of 2π. Additional phase shift is introduced in the center of the grating to add differential signals from maximums and minimums of the channel interference pattern with signs needed for detecting the full signal amplitude.

Instead of waveguides, two bulk gratings may be used to perform the filtering function. In FIG. 5, first diffraction grating 52, and the second diffraction grating 53 are shown in dashed boxes. Distance between gratings 52 and 53 is $L\pm L_C>>L_C$.

Partially coherent light is a random field, and according to the method of the present invention, the interference pattern measurement in several points of the phase range allows to reduce noise and hence improve signal to noise ratio. General approaches to noise reduction by simultaneous measurement at several phases (parallel analysis) or averaging in time (serial analysis) are discussed in the theory of analysis of random processes [for example, A. A. Charkevitch, Spectra and Analysis, 4-th ed., Moscow, 1962]. According to this theory, for K independent measurements, the noise is reduced by a factor of $1/K^{1/2}$. However, the values of field in the interference pattern of partially coherent light are not totally independent and have to be specifically analyzed.

Amplitude fluctuations and respective intensity fluctuations originating from the light source are totally eliminated by the filtering system shown in FIGS. 3, 4, 5.

Phase fluctuations are originated by transient variations of the source frequency. The output of a partially coherent light source may be presented as a short segment of a harmonic field with a specific phase and frequency. The phase and frequency may be considered constant for a segment length of $L_C$. With $L_C$~20–30 μk and central wavelength λ=1.5 μk, the field segment is about 15–20 wavelengths long. Each grating (52 and 53 in FIG. 5) may be presented as two conventional diffraction gratings with π phase shifts between each pair of adjacent grooves (multi-π grating, or MEG). Presentation of a receiving CDM system as MπG grating is useful for performance analysis. When the sequence of light segments is analyzed by a MπG system, the random waves diffracted by gratings 52 and 53 do not interfere with each other. For each grating, the output optical field may be written as $$E=E_0[exp(i\phi)+exp(-i\pi+2i\phi)+exp(3i\phi)+exp(-i\pi+4i\phi)+ \ldots ] \quad (3)$$

or, after summation, $$E = E_0[\exp(i\varphi) + \exp(-i\pi + 2i\varphi)]\frac{\exp(Ki\varphi) - 1}{1 - \exp(2i\varphi)} \quad (4)$$

where K is a number of MπG periods.

Figure 6:
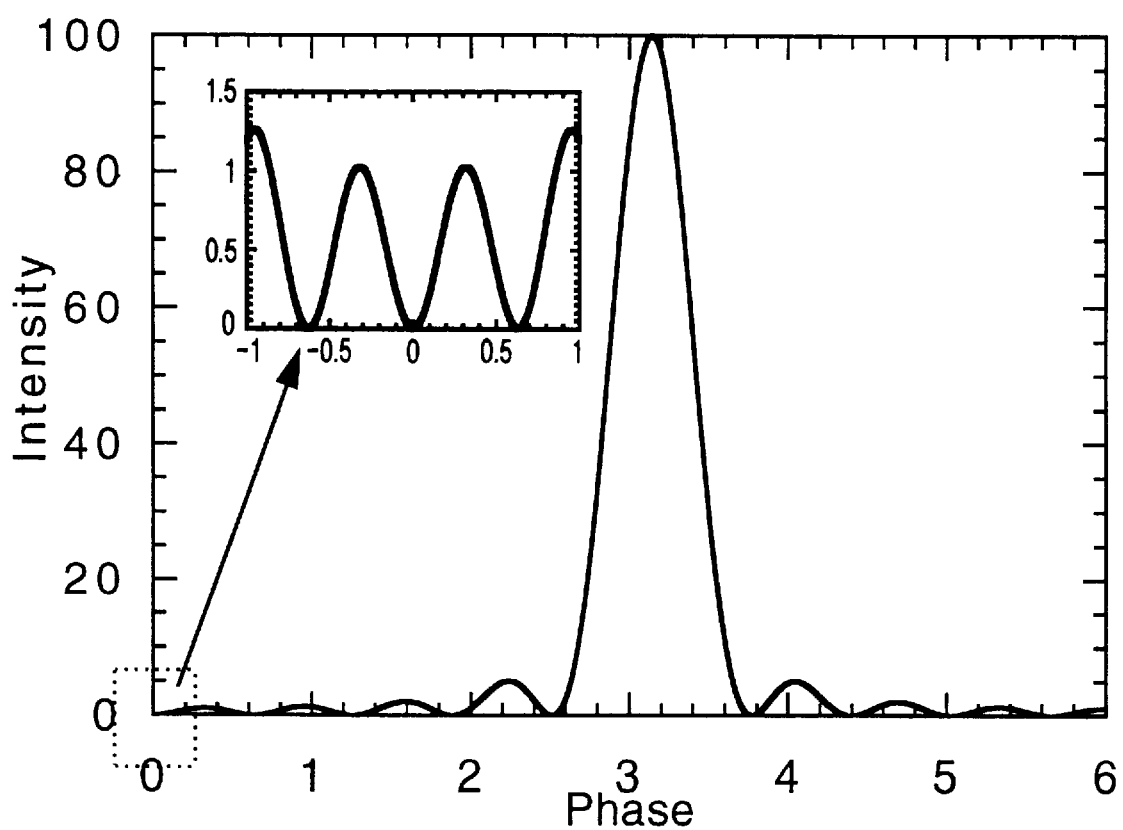
FIG. 6 is a plot of Multi-π Grating diffraction efficiency.

The intensity of a plane wave diffracted by MπG calculated from Eq. (4) is shown in FIG. 6 for a grating with K=10 as a function of phase shift φ=Δ(ωt). The first diffraction maximum occurs at the phase φ=π which corresponds to an angle of diffraction θ=π/4h, where h is a grating period in horizontal direction of FIG. 5. In the back reflection (θ=π/2)

where the signal is detected, the field amplitude is reduced by a factor of 100 which is the square of the grating period number K. This analysis shows that MπG effectively reduces the intensity of incoherent component belonging to non-selected CDM channels and responsible for the detector noise. As such, MπG performs optical filtering which is functionally similar to performance of narrow-band filters in WDM systems, and the expected CDM signal to noise ratio performance is similar to that of an "ideal" WDM system with the same number of channels.

For example, a source such as Erbium Doped Fiber Amplifier having $L_C$~20–30 $\mu$k would require the number of MπG periods $2K$~$2L_C/\lambda$~30–40. With these K values, the electric field intensity reaching the detector and responsible for the frequency and phase fluctuations is reduced by over 30 dB. For a rough estimate of signal to noise ratio, the shot noise power $\sqrt{<P>^2}=\sqrt{\hbar\omega P\Delta\omega}$ may be attributed to the frequency fluctuations only. For a source power P=10 mW, $\lambda$=1.5 $\mu$k and $\Delta\omega$=30 nm, the signal to noise ratio is approximately 50/N where N is the number of channels. In the system with N=$10^3$ channels, the 30 dB reduction of incoherent component intensity provides signal to noise ratio ~1 which is similar to a hypothetical WDM system with equivalent parameters.

MπG is designed and manufactured to provide appropriate carrier phase delay between each individual pair of arms and $2\pi$-shifts between the adjacent cells of each differential interferometer. The design should be adequate for changing the sign of contributions of differential interferometers measuring signals on the opposite parts of the channel interference pattern. The maximum difference in the interferometer arms length depends on the channel bit rate and is several centimeters for 2.5 Gbit/sec. With this difference in arm length and required manufacturing accuracy, at least two manufacturing technologies are adequate, a lithographic processing earlier developed for Array Waveguide Gratings (AWG), and a bulk grating approach.

Figure 7:
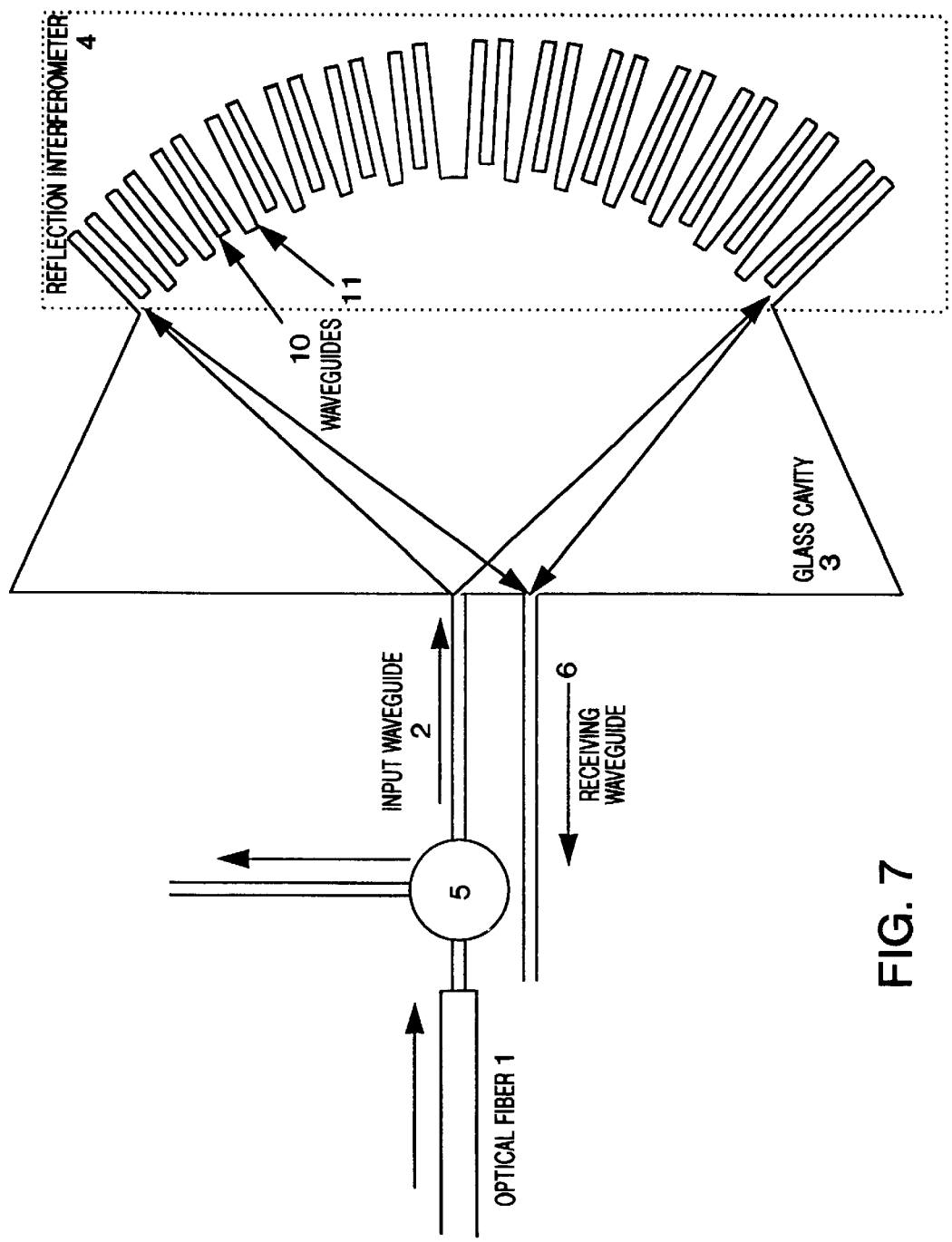
FIG. 7 shows a Multi-π Grating lithographic design.

In AWG technology, a thin layer of glass is deposited on a Si wafer, and the waveguides are molded by glass etching. The MπG design is significantly different from AWG. The major difference is that it is more appropriate to implement MπG not in transmission but reflection geometry. In FIG. 7, a possible MπG implementation is shown. Input optical fiber 1 is coupled into waveguide 2 and diffracts light into glass cavity 3 with a semi-circle border. At the semi-circle, reflection interferometer 4 is positioned having an even number of interferometric waveguides 10 and 11. Each waveguide pair 10, 11 is positioned at radial distance from input waveguide 2, different from the adjacent pairs, by a half wavelength $\lambda/2$ creating a $2\pi$ phase shift between the adjacent interferometric pairs. In the central interferometric pair, the length difference between the waveguides 11 and 10 equals L/2 where the length L corresponds to a carrier phase shift. The number of pairs depends on the source spectral width and respective coherence length, and is selected to accommodate adequate noise reduction. To provide 100% reflection at the ends of each waveguide, total internal reflection geometry or multilayer dielectric coating may be used. Other MπG parameters (diffraction angle, waveguide dimensions, geometry of waveguide inputs) are similar to AWG.

Depending on the MπG design, the signal may be directed back to the input waveguide 2 and passed to a detector through optical circulator 5, or focused to an off-center receiving waveguide 6. In the last case, waveguides 10, 11 outputs are positioned along spiral curves with the center at input waveguide 2.

Other technological MπG design and manufacturing parameters (waveguide geometry, photolithographic accuracy, power loss, thermal stability etc.) are similar to AWG.

Another possible MπG technology is bulk grating technology (reflection or transmission). In a reflection grating technology, with gratings 52 and 53 shown by dotted rectangles in FIG. 5, the beam of light diffracted from the fiber is collimated by lens 50 into a parallel beam and diffracted by gratings 52 and 53 separated by a distance L/2. Reflection gratings may be manufactured by depositing metal stripes on a glass substrate, at least two depositions may be required to provide adequate phase shift of $\pi$ between each two adjacent stripes. Transmission gratings may be manufactured by glass etching. Special alignment means for MπG adjustment to the channel central phase have to be implemented in this MπG design.

CDM technology is alternative to WDM, and the CDM system parameters such as maximum number of channels, maximum reach, signal-to-noise ratio, manufacturability, reliability, cost etc. should be compared with the WDM system parameters.

Theoretically, CDM and WDM are equivalent in maximum number of channels and signal-to-noise ratio. However, in practical terms CDM has an important potential advantage over WDM for large number of channels exceeding ~100.

In WDM systems, maximum reach is defined by a minimum tolerable signal to noise ratio at the end of a series of optical amplifiers. In general, CDM systems should perform better because phase modulated systems are better protected from noise than amplitude modulated systems. For CDM and WDM systems of a theoretical capacity, the maximum reach is the same. However, in practical WDM systems, noise is integrated within the filter passband, which is normally several times wider than the useful spectrum carrying optical signal. In CDM system of the present invention, the amplifier noise will be reduced exactly by the same factor as the noise of other channels, and practically the CDM system may have a maximum reach an order of magnitude longer than the WDM with the wide spectral filters.

With the MπG technology developed, CDM system manufacturing is significantly cheaper than WDM system manufacturing. In CDM systems, optical amplifiers or light emitting diodes are used as light sources. These sources provide optical power for many channels physically deployed in the same location. There is no need for lasers with high wavelength stability. The CDM system modulators are similar to those currently used for WDM systems. Manufacturability of receivers, AWG in WDM and CDM and MπG systems is technologically similar. The new CDM method and system therefore allow for the theoretical capacity with the existing technology, while exhibiting higher reliability and lower cost.

While there have been shown and described what are at present considered preferred embodiments of the present invention, it will be obvious to those skilled in the art that various changes and modifications may be made to the interlayer communication system and its implementation in the network architecture without departing from the scope of the invention as defined by the appended claims.

What is claimed is:

1. A Coherence Division Multiplexing (CDM) system for multichannel transmission of an optical signal through an optical fiber comprising:

a light source having an optical spectral range comparable to a transparency band of said optical fiber;

a transmitting system for producing and transmitting a plurality of CDM optical signals;

a receiving and filtering system for selecting each CDM optical signal of said plurality, acquiring an optical interference pattern of said each CDM optical signal and optical filtering of noise caused by all other non-selected CDM optical signals, each interference pattern having a carrier phase and a phase range, and a detecting system for detecting said each selected CDM optical signal and converting said each selected CDM optical signal into a respective electrical signal.

2. The Coherence Division Multiplexing system of claim 1, wherein said receiving and filtering system further comprises a plurality of differential interferometers connected in parallel therebetween for measuring parameters of each said optical interference pattern in a plurality of phases within each respective phase range of each respective CDM optical signal.

3. The Coherence Division Multiplexing system of claim 2, wherein a maximum difference between optical paths of said differential interferometers exceeds at least one coherence length of said light source.

4. The Coherence Division Multiplexing system of claim 3, wherein a minimum difference between optical paths of said differential interferometers equals one central wavelength of said light source.

5. The Coherence Division Multiplexing system of claim 4, wherein each said differential interferometer comprises at least a pair of interferometers for measuring said parameters of said each optical interference pattern at a first and a second phases separated by a predetermined phase difference, and obtaining the difference between the measurements at said first and second phases by subtracting the measured value parameters from each other.

6. The Coherence Division Multiplexing system of claim 5, wherein said predetermined phase difference is $2\pi$.

7. The Coherence Division Multiplexing system of claim 6, wherein said differential interferometers are made of a plurality of planar waveguides.

8. The Coherence Division Multiplexing system of claim 7, wherein said planar waveguides are glass waveguides on a silicon wafer.

9. The Coherence Division Multiplexing system of claim 8, wherein said filtering system further comprises an input fiber, an input waveguide, and input cavity which are connected in series therebetween, and a plurality of said planar waveguides is connected to said input cavity, an output cavity and an output waveguide.

10. The Coherence Division Multiplexing system of claim 8, wherein said filtering system further comprises an input fiber, an input waveguide, and input cavity which are connected in series therebetween, and a plurality of said planar waveguides is connected to said input cavity.

11. The Coherence Division Multiplexing system of claim 10, wherein each said planar waveguide comprises a coating which provides about 100% back reflection.

12. The Coherence Division Multiplexing system of claim 10, wherein said filtering system further comprises an optical circulator which is disposed within said input fiber.

13. The Coherence Division Multiplexing system of claim 10, wherein said filtering system further comprises an output waveguide.

14. The Coherence Division Multiplexing system of claim 5, wherein said filtering system is made of at least a pair of spaced apart diffraction gratings.

15. The Coherence Division Multiplexing system of claim 14, wherein said diffraction gratings are transmission gratings.

16. The Coherence Division Multiplexing system of claim 14, wherein said diffraction gratings are reflection gratings.

17. The Coherence Division Multiplexing system of claim 1, comprising at least one differential interferometer for measuring parameters of each said optical interference pattern in at least two phases within each respective phase range of each said respective CDM optical signal, wherein said two phases are separated by $\pi$.

18. A Coherence Division Multiplexing method for transmitting a plurality of communication channels through an optically transparant medium comprising the steps of:

providing an optical power source for forming a plurality of optical carriers;

phase delaying each said optical carrier therebetween;

modulating each said optical carrier by a communication channel;

transmitting said carriers through said optically transparant medium;

selecting and receiving each said carrier and acquring power distribution in an interference pattern of each said carrier;

optical filtering of said power distribution of each said carrier by reducing of optical power associated with other carriers; and detecting each said selected and filtered carrier by converting an optical signal related to said each carrier into an electrical signal.

19. The Coherence Division Multiplexing method of claim 18, wherein said step of optical filtering further comprises the steps of eliminating a detected DC optical power associated with said interference pattern of each said carrier; eliminating a detected optical power associated with amplitude fluctuations of said power source, and reducing a detected optical power associated with phase fluctuations of said power source.

20. The Coherence Division Multiplexing method of claim 19, wherein said steps of eliminating detected optical power associated with DC component and amplitude fluctuations of said interference pattern of each said carrier, and reducing a detected power associated with phase fluctuations of said interference pattern of each said carrier, are provided by utilizing differential interferometry.

21. A Coherence Division Multiplexing method for multichannel transmission of an optical signal through an optical fiber comprising the steps of:

providing a light source producing a light beam with a predetermined spectral range comparable to a spectral transparency band of said optical fiber;

propagating said light beam though a transmission system;

generating a plurality of coherence divided optical signals, each coherence divided optical signal of said plurality having a predetermined bandwidth;

multiplexing said coherence divided optical signals and providing a plurality of CDM optical signals;

propagating CDM optical signals along said optical fiber;

selecting each CDM optical signal;

acquiring an interference pattern of each said selected CDM optical signal;

optical filtering of said CDM optical signals by measuring parameters of said respective interference patterns in a plurality of phases, and processing the values of said parameters for each CDM optical signal;

optical filtering of noise by measuring parameters of said interference pattern in a plurality of phases, and processing the values of said parameters for each CDM optical signal; and detecting said selected CDM optical signal.

22. The Coherence Division Multiplexing method of claim 21, wherein the step of measuring said parameters further comprises the step of measuring intensity of said interference pattern.

23. The Coherence Division Multiplexing method of claim 21, wherein said predetermined spectral range of said light beam has a central wavelength.

24. The Coherence Division Multiplexing method of claim 23, wherein the step of propagating said light beams further comprises a step of splitting said light beam to a plurality of primary light beams.

25. The Coherence Division Multiplexing method of claim 21, wherein the step of generating CDM optical signal further comprises the steps of:

providing an interferometer with two arms along an optical path of each primary light beam of said plurality;

providing path difference between said two arms, wherein minimum value of said path difference exceeds several coherence lengths of said light source, and maximum value of said path difference does not exceed $2c_0/G$, where co is velocity of light in said optical fiber, and G is a channel bit rate; and phase modulating of a fraction of the primary light beam passing through one of said arms.

26. The Coherence Division Multiplexing method of claim 21, wherein the step of selecting each CDM optical signal and acquiring an interference pattern of each CDM optical signal is provided by splitting the transmitted plurality of CDM optical signals into a plurality of secondary optical beams and passing each secondary optical beam through a plurality of interferometers compensating for the path difference introduced in said primary light beams.

27. The Coherence Division Multiplexing method of claim 26, wherein the step of filtering each CDM optical signal and optical noise is provided by measuring parameters of said interference patterns of secondary light beams in a plurality of phases, and processing the values of said parameters for each CDM optical signal.

28. The Coherence Division Multiplexing method of claim 27, wherein the step of detecting said selected CDM optical signal is provided by conversion of processed values of said parameters of interference patterns of said secondary light beams into electrical signals.

29. The Coherence Division Multiplexing method of claim 27, wherein a maximum difference between optical paths of said secondary light beams exceeds at least one coherence length of said light source.

30. The Coherence Division Multiplexing method of claim 27, wherein a minimum difference between optical paths of said secondary light beams equals to one central wavelength of said light source.

31. The Coherence Division Multiplexing method of claim 27, wherein said plurality of phases is determined at extremes and zeroes of said interference patterns, said extremes are maximums and minimums of said interference patterns.

32. The Coherence Division Multiplexing method of claim 27, wherein the step of processing the values comprises subtracting the values of measured parameters related to adjacent phases of said plurality of phases.

33. The Coherence Division Multiplexing method of claim 27, where said adjacent phases differ by $2\pi$.

* * * * *